United States Patent
Jungmaier et al.

(10) Patent No.: US 8,742,981 B2
(45) Date of Patent: Jun. 3, 2014

(54) MICROSTRIP COUPLER COMBINING TRANSMIT-RECEIVE SIGNAL SEPARATION AND DIFFERENTIAL TO SINGLE ENDED CONVERSION

(75) Inventors: Reinhard-Wolfgang Jungmaier, Alkoven (AT); Reinhard Feger, Scheffau (AT); Bernhard Prammer, Enns (AT); Andreas Stelzer, Linz (AT)

(73) Assignee: Infineon Technologies AG, Neubiberg (DE)

( * ) Notice: Subject to any disclaimer, the term of this patent is extended or adjusted under 35 U.S.C. 154(b) by 290 days.

(21) Appl. No.: 13/214,338

(22) Filed: Aug. 22, 2011

(65) Prior Publication Data
US 2013/0050012 A1    Feb. 28, 2013

(51) Int. Cl.
*G01S 13/00* (2006.01)

(52) U.S. Cl.
USPC ........................................... 342/175; 333/120

(58) Field of Classification Search
USPC .................. 342/118, 175, 198, 200; 333/120
See application file for complete search history.

(56) References Cited

U.S. PATENT DOCUMENTS

| | | | |
|---|---|---|---|
| 2,789,271 A * | 4/1957 | Budenbom | 333/120 |
| 4,420,839 A * | 12/1983 | Hogerheiden, Jr. | 455/327 |
| 5,587,713 A | 12/1996 | Pfizenmaier et al. | |
| 5,903,827 A * | 5/1999 | Kennan et al. | 455/326 |
| 5,986,519 A * | 11/1999 | Kellett et al. | 333/120 |
| 6,094,158 A * | 7/2000 | Williams | 342/70 |
| 7,511,658 B1 * | 3/2009 | Grebennikov et al. | 342/175 |
| 7,639,102 B2 * | 12/2009 | Wagner et al. | 333/120 |
| 2008/0079632 A1 * | 4/2008 | Jaeger et al. | 342/194 |
| 2008/0278370 A1 * | 11/2008 | Lachner et al. | 342/200 |
| 2009/0289737 A1 * | 11/2009 | Itoh et al. | 333/120 |
| 2010/0093293 A1 * | 4/2010 | Grebennikov et al. | 455/150.1 |

FOREIGN PATENT DOCUMENTS

DE    102006046728 A1    4/2008

OTHER PUBLICATIONS

Inui, Chiaki, et al. "On-Chip S-Shaped Rat-Race Balun for Millimeter-Wave Band Using Wafer-Level Chip-Size Package Process." Proceedings of the 3rd European Microwave Integrated Circuits Conference. 4 Pages, Oct. 2008.

Tessmann, A., et al. "A 77 GHz GaAs pHEMT Transceive MMIC for Automotive Sensor Applications." Fraunhofer Institute for Applied Solid State Physics (IAF), Tullastr. 72, D-79108 Freiburg, Germany, 4 Pages, Oct. 1999.

* cited by examiner

*Primary Examiner* — John B Sotomayor
*Assistant Examiner* — Marcus Windrich
(74) *Attorney, Agent, or Firm* — Eschweiler & Associates, LLC

(57) ABSTRACT

One embodiment relates to a coupler that can be used in a radar system. The coupler includes differential ports, an antenna port, a receiver port, a local port and a transmission path. The differential ports are configured to receive a differential signal. The antenna port is configured to output a transmitted signal and to input a received signal. The transmitted signal is derived from the differential signal. The receiver port is configured to output a portion or version of the received signal. The local port outputs a local signal, which is also derived from the differential signal. The transmission path is coupled to the differential ports, the antenna port, the receiver port and the local port. The transmission path typically has a length selected to derive or output the signals at the above ports.

20 Claims, 13 Drawing Sheets

| System | Diff. sig. to antenna | Diff. sig. to receiver | antenna to receiver |
|---|---|---|---|
| Two Couplers (Fig. 2) | -4.3 dB | -35.0 dB | -3.3 dB |
| Single Coupler (Fig. 3E) | -3.5 dB | -50.0 dB | -3.5 dB |

Fig. 4

MICROSTRIP COUPLER COMBINING TRANSMIT-RECEIVE SIGNAL SEPARATION AND DIFFERENTIAL TO SINGLE ENDED CONVERSION

BACKGROUND OF THE INVENTION

In microwave and millimeter-wave automotive radar systems, low cost and high performance radar is required. The typical radar system includes an oscillator, a power divider, a power amplifier and a differential (or quadrature) hybrid combiner, using a single antenna to reduce the entire size. However, such a radar system is not very efficient since only half an output power flows to the antenna, while the other half flows to the ballast resistor of the hybrid. Alternately, if two separate transmitting and receiving antennas are utilized, the overall area occupied by the radar system is too large to embody a miniature radar system. In addition, the complete car radar system usually requires several transmitting and receiving paths with corresponding antennas to properly monitor the space from all sides of the car.

FIG. 1 illustrates a conventional automotive RADAR system 100 for transmitting and receiving radar signals. Radar system 100 comprises an oscillator 104 operable to supply a radio frequency (RF) signal 105 such as a millimeter wavelength signal. RADAR system 100 further comprises a power divider 110 which splits and drives the RF signal 105 to a power amplifier 120 and to a mixer (M) 160. The power amplifier 120 is used for amplifying and driving a radar transmission signal 125 into an antenna 150 and a ballast resistor 140, by way of a rat-race coupler or hybrid coupler 130. The mixer M 160 combines a received radar signal 155 from the antenna 150 by way of the coupler 130, with the original RF signal 105 by way of the divider 110, to provide an intermediate frequency (IF) signal 170. Thereafter, the IF signal 170 may be passed to a conventional RADAR detection system (not shown).

However, the conventional radar system 100 of FIG. 1 is not very efficient, since only half (50%) of the output power of the radar transmission signal 125 flows to the antenna 150, while the other half flows to the ballast resistor 140 on the hybrid coupler 130. Further, the system 100 requires a single ended RF signal 105 instead of a differential RF signal.

BRIEF DESCRIPTION OF THE DRAWINGS

The following description and annexed drawings set forth in detail certain illustrative aspects and implementations of the invention. These are indicative of but a few of the various ways in which the principles of the invention may be employed.

FIG. 4 is a table comparing simulated data for a single coupler signal converter and a dual coupler signal converter.

DETAILED DESCRIPTION OF THE INVENTION

Figure 1:
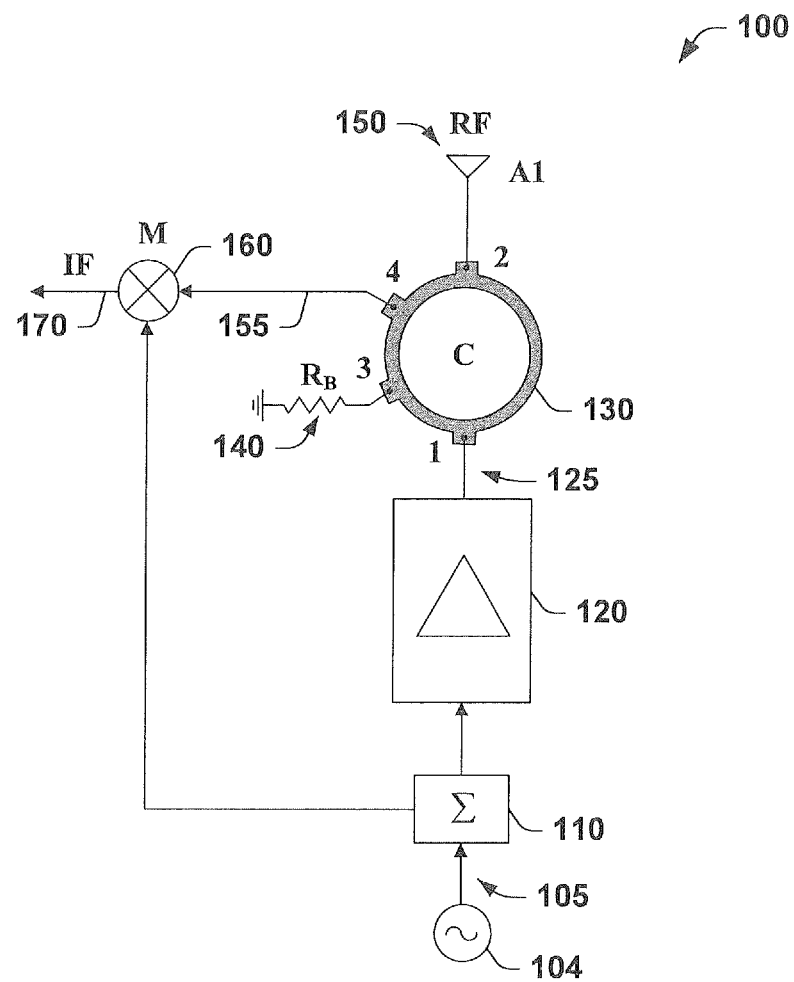
FIG. 1 illustrates a conventional automotive radar system for transmitting and receiving radar signals.

The present invention will now be described with respect to the accompanying drawings in which like numbered elements represent like parts. The figures and the accompanying description of the figures are provided for illustrative purposes and do not limit the scope of the claims in any way.

One embodiment of the invention relates to a coupler that can be used in radar systems, communication systems and the like. The coupler includes differential ports, an antenna port, a receiver port, a local port and a transmission path. The differential ports are configured to receive a differential signal. The antenna port is configured to output a transmitted signal and to input a received signal. The transmitted signal is derived from the differential signal. The receiver port is configured to output a portion or version of the received signal. The local port outputs a local signal, which is also derived from the differential signal. The transmission path is coupled to the differential ports, the antenna port, the receiver port and the local port. The transmission path typically has a length selected to derive or output the signals at the above ports. An alternate embodiment of the above specifies that the transmission path is circular shaped and has a length of one and a half wavelengths. Another alternate embodiment of the above specifies that the transmission path has a length an odd integer multiple of one and a half wavelengths.

Another embodiment of the invention relates to a signal conversion system. The system includes a receiver, a local component, a source, and a coupler. The receiver process a received signal. The local component processes a local signal. The source generates the differential signal. The coupler has a circular transmission path, differential ports, an antenna port, a receiver port and a local port. The transmission path is circular and has a specified transmission length. The differential ports receive the differential signal. The antenna port provides a transmitted signal and inputs a received signal. The transmitted signal is a single ended signal converted from the differential signal. The receiver port is isolated from the differential signal and provides the received signal, or a version of the received signal, from the antenna port. The local port provides a local signal, which is converted from the differential signal. In another embodiment, the received signal is a communication signal. In another embodiment, the received signal and the local signal are utilized to determine delay and/or distance for a radar application.

Generally, there are two types of signals used in radar systems, differential signals and single ended signals. Differential signals are resistant to noise and operate well at high frequencies. Further, power supply noise and oscillator leakage in differential signal can be canceled or mitigated by selecting appropriate topologies. Additionally, differential signals tend to have improved linearity. However, many off chip devices and other devices typically utilize single-ended signals. Further, tests for devices utilizing single ended signals tend to be relatively simpler.

Thus, RADAR systems may implement and utilize differential signals and single ended signals. Thus, conversion from differential signals via some mechanism is then required. One mechanism to convert from differential signal to a single ended signal is to utilize a coupler, such as a rat race coupler or balun. A rat race coupler is a device with a circular transmission line and four ports. The circumference or total length of the transmission line is 1.5 a wavelength (λ). The distance between port 1 and port 2 is ¾ a wavelength. The distance between port 1 and port 3 is ¼ a wavelength. The distance between port 3 and port 4 is ¼ a wavelength. The distance between port 4 and port 2 is ¼ a wavelength. Additionally, each port has a characteristic impedance, for example of 50 ohms.

Signals input at ports travel along the transmission path of the coupler until they reach other ports. The transmission path length results in phase shifts. For a signal input to port 1, there are signals received from clockwise and counter clockwise directions at the other ports. At port 3, there is a 90 degree phase shift in a clock wise direction and a 450 degree phase shift in a counter clockwise direction, thus, the signals combine at port 3. At port 4, there is a 180 degree phase shift in a clockwise direction and a 360 degree phase shift in a counter clockwise direction, thus the signals cancel each other out. At port 2, there is a 270 degree phase shift in a clockwise direction and a 270 degree phase shift in a counter clockwise direction, thus the signals add constructively. As a result, power provided at port 1 is split into two halves which are available at port 3 and port 2. No power is available at port 4 because the signals cancel each other.

For a signal input to port 2, there are also signals received from clockwise and counter clockwise directions at the other ports. At port 4, there is a 90 degree phase shift in a counter clockwise direction and a 450 degree phase shift in a clockwise direction, thus, the signals combine at port 4. At port 3, there is a 180 degree phase shift in a counter clockwise direction and a 360 degree phase shift in a clockwise direction, thus the signals cancel each other out. At port 1, there is a 270 degree phase shift in a clockwise direction and a 270 degree phase shift in a counter clockwise direction, thus the signals add constructively. Power flowing into port 2 is split into two halves which are available at port 1 and port 4. Port 3 is isolated in that no power from port 2 is transferred to port 3.

Using a rat-race coupler allows separating signals from different directions by using various ports as input. As shown below, the rat race coupler can be used for differential signal to single ended signal conversion by utilizing three of the four ports. In one example, ports 1 and 4 are used for a differential signal, port 3 is unused, and port two is used for a single ended signal. The rat race coupler can also be used to utilize a single antenna for transmission and reception.

Figure 2:
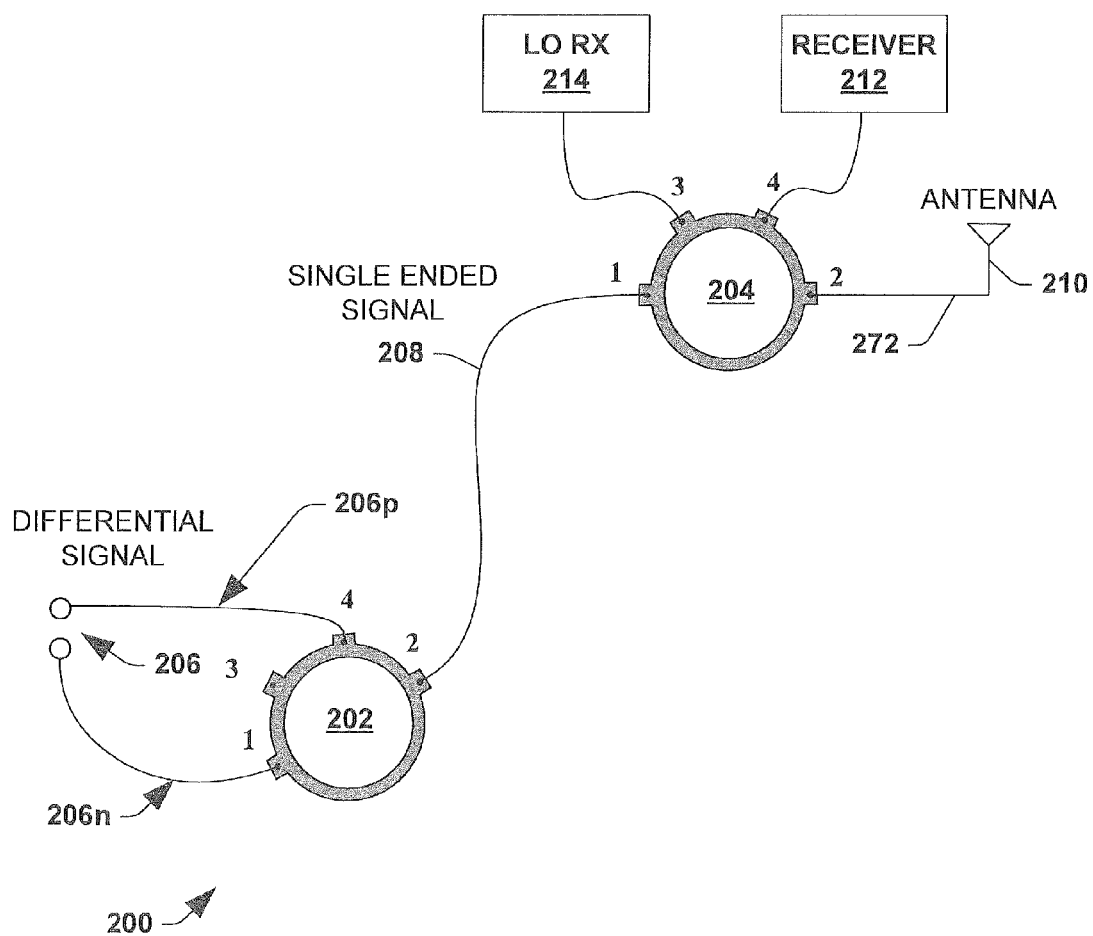
FIG. 2 is a diagram illustrating an example of a system that performs transmit and receive signal separation and differential to single ended conversion.

FIG. 2 is a diagram illustrating an example of a system 200 that converts from differential signals and separates signals. The system uses two couplers to perform the signal conversions.

Here, a first coupler 202 has ports 1-4 and converts a differential signal 206 to a single ended signal 208. The differential signal 206 includes a positive component 206p and a negative component 206n. Port 1 receives the negative component 206n and port 4 receives the positive component 206p. The differential signal 206, in one example, is sinusoidal and at a relatively high frequency, such as 77 GHz. The coupler 202 produces the single ended signal 208 at port 2. Port 3 is isolated.

As stated above, signals input at coupler ports separate into two signals, traveling clockwise and counter clockwise, and travel along the transmission paths of the coupler until they reach other ports. The transmission path length results in phase shifts. For negative component 206n input to port 1, there are signals received from clockwise and counter clockwise directions at the other ports. The positive component 206p is provided at port 4 and also results in clockwise and counter clockwise signals. At port 3, the signals from components 206n and 206p cancel each other because of the phase angles there between of 90 degrees and 270 degrees, thus no power or signal is provided at port 3. The positive component 206p and the negative component 206n combine at port 2 because the phase angles of 90 degrees and 450 degrees add constructively to produce the single ended signal 208. Thus, the power from ports 4 and 1 is combined and provided at port 2.

A second coupler 204 has ports 1-4. Port 1 receives the single ended signal 208 from port 2 of the first coupler 202. The single ended signal 208 is split and provided to port 2 and port 3. Port 2 provides half of the single ended signal 208 as a transmitted signal to the antenna 210. A local component 214 also receives the other half of the single ended signal via port 3. Additionally, port 2 inputs a received signal 272 from the antenna 210, which is split and routed to port 4 and port 1.

The single ended signal 208 flows into port 1 of the second coupler 204 and is split into two halves which are available at ports 2 and 3. Port 4 is isolated from the single ended signal 208. Thus, no power flows from port 1 to port 4 from the single ended signal 208. The received signal 272 is provided or input to port 2 and is split into halves and provided to port 1 and port 4. It is noted that half the power from the received signal is lost at port 1. Port 3 is isolated from the received signal.

As a result, the local component 214 receives a portion or version of the single ended signal 208, referred to as a non-delayed transmit signal or copy of the transmitted signal and the receiver 212 receives the received signal. These component and additional components can utilize these signals for RADAR and/or communication purposes. For radar applications, the delay can be determined from the transmitted signal and the received signal.

The system 200 works well, but has several disadvantages. A larger integrated circuit and printed circuit board is required to implement the multi coupler design. This in itself leads to increased size, cost and power usage. Further, the system 200 also loses half of the power of the received signal due to the coupler design.

FIGS. 3A-3E illustrate a single coupler system that performs differential to single ended conversion and signal separation in accordance with an embodiment of the invention. The coupler and system can be fabricated on printed circuit boards (PCB) using microstrip technology. A typical microstrip implementation utilizes RF structures, such as a coupler, lines, and the like formed on top of a dielectric material. The dielectric material is generally formed on a conductive, ground plane.

Figure 3A:
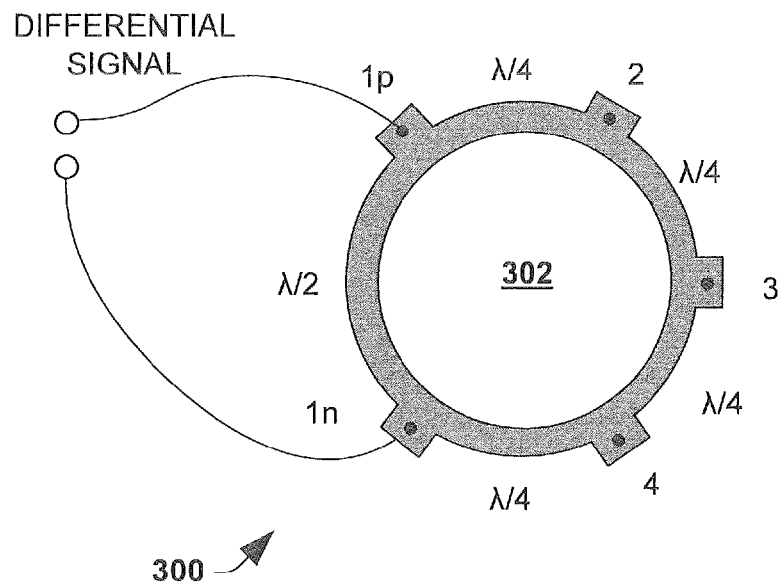
FIG. 3A is a diagram illustrating a single coupler signal converter system that performs transmit and receive signal separation and differential to single ended conversion in accordance with an embodiment of the invention.

FIG. 3A is a diagram illustrating a single converter system 300 in accordance with an embodiment of the invention. The system 300 includes a signal converter coupler 302.

The signal converter coupler 302 has 5 ports, instead of 4 ports of other rat race couplers. The coupler 302 has a circular transmission path with a total length or circumference of 1.5 wavelengths. Ports 1p and 1n typically serve as connections to a differential signal and are referred to as differential ports. Ports 2, 3, and 4 can serve as single ended outputs or inputs. Further, each port has a characteristic impedance value, for example, 50 ohms.

The transmission length between ports 1p and 2, ports 2 and 3, ports 3 and 4 and ports 4 and 1n is ¼ a wavelength. The transmission length between ports 1p and 1n is ½ a wavelength. It is noted that the transmission length between ports 1p and 1n is the same as the transmission length between differential connections between ports 1 and 4 of a standard rat-race coupler, ½ a wavelength.

It is noted that alternate embodiments of the invention can include other transmission lengths. Other lengths that yield substantially similar phase shifts and are suitable, such as odd integer multiples of the above specified lengths. Thus, in another example, the transmission length between ports 1p and 2, ports 2 and 3, ports 3 and 4 and ports 4 and 1n is ¾ a wavelength. The transmission length between ports 1p and 1n is 3/2 wavelengths. The total entire transmission path of the coupler would then be 4.5 wavelengths.

Figure 3B:
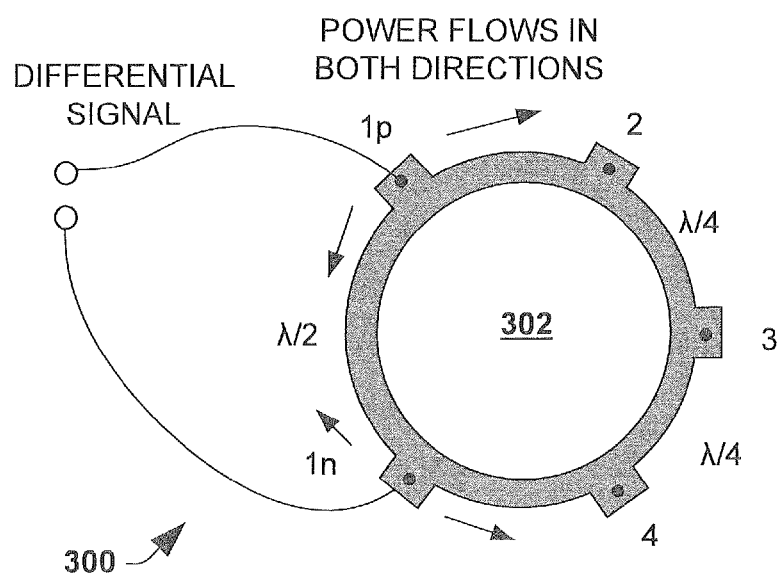
FIG. 3B is another diagram illustrating a single coupler signal converter system that performs transmit and receive signal separation and differential to single ended conversion in accordance with an embodiment of the invention.

FIG. 3B is another diagram illustrating the single converter system 300 in accordance with an embodiment of the invention. The system 300 includes the signal converter coupler 302.

Power flowing into port 1p is evenly split into clockwise and counter clockwise directions or portions. Similarly, power flowing into port 1n is also evenly split into clockwise and counter clockwise directions. The power flowing into ports 1n and 1p cancels each other at port 3, which becomes isolated.

The clockwise and counter clock wise portions from port 1p add constructively and are provided at port 2. The portions also add constructively and are provided at port 4. At port 1n and port 3, the portions from port 1p cancel each other.

Similar to port 1p, the clockwise and counter clock wise portions from port 1n add constructively and are provided at port 2. Further, the portions also add constructively and are provided at port 4. At port 1p and port 3, the portions from port 1n cancel each other. Thus the power input to ports 1n and 1p is provided at ports 2 and 4.

Figure 3C:
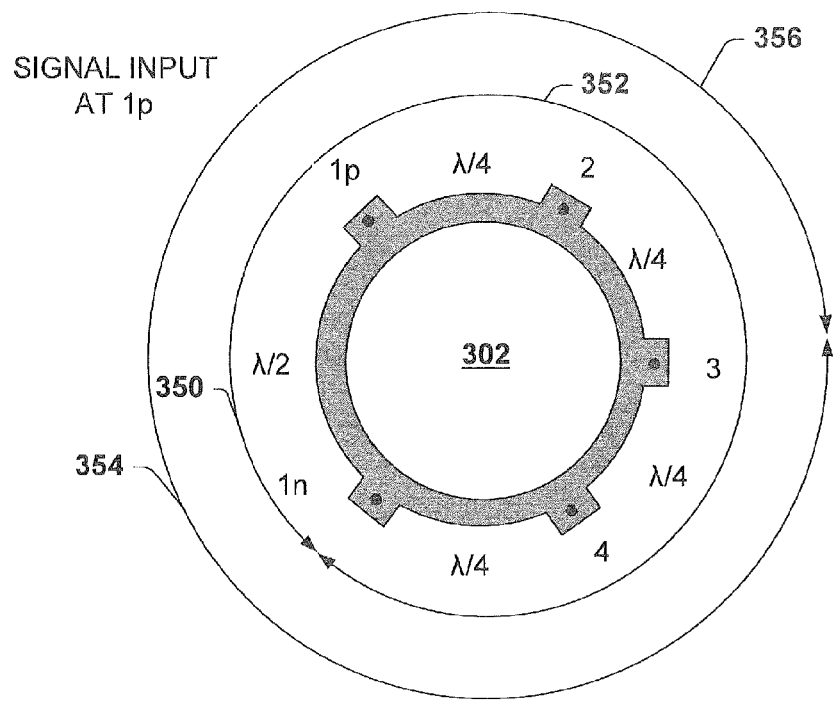
FIG. 3C is a diagram illustrating a single coupler signal converter system that performs transmit and receive signal separation and differential to single ended conversion in accordance with an embodiment of the invention.

FIG. 3C is another diagram illustrating the single converter system 300 in accordance with an embodiment of the invention. The system 300 includes the signal converter coupler 302. This diagram depicts a signal input at port 1p.

A first component of a differential signal, referred to as the positive component, is input to port 1p of the coupler. As a result, clockwise and counter clockwise portions of the signal travel in each direction around the coupler. As shown above, there are varied transmission lengths from port 1p to other ports of the coupler in both the clock wise and counter clockwise directions. These varied lengths result in phase shifts.

For the positive component input at port 1p, the transmission path length in the counter clockwise direction from port 1p to port 1n is ½ a wavelength, which results is a 180 degree phase shift 350. The transmission length in the clockwise direction from port 1p to port 1n is 1 wavelength, which corresponds to 360 degree phase shift 352. As a result, the clockwise and counter clockwise portions cancel each other at port 1n. Thus, no power or signal from the positive component is provided at port 1n.

The transmission path length in the clockwise direction from port 1p to port 2 is ¼ a wavelength, which results in a 90 degree phase shift. The transmission length in the counter clockwise direction from port 1p to port 2 is 1 and ¼ wavelengths, which corresponds to 450 degree phase shift. As a result, the clockwise and counter clockwise portions constructively add with each other at port 2. Thus, a signal from the positive component is provided at port 2.

For the positive component input at port 1p, the transmission path length in the clockwise direction from port 1p to port 3 is ½ a wavelength, which results is a 180 degree phase shift 356. The transmission length in the counter clockwise direction from port 1p to port 3 is 1 wavelength, which corresponds to 360 degree phase shift 354. As a result, the clockwise and counter clockwise portions cancel each other at port 3. Thus, no power or signal from the positive component is provided at port 3.

The transmission path length in the clockwise direction from port 1p to port 4 is ¾ a wavelength, which results is a 270 degree phase shift. The transmission length in the counter clockwise direction from port 1p to port 4 is also ¾ a wavelength, which corresponds to a 270 degree phase shift. As a result, the clockwise and counter clockwise portions constructively add with each other at port 4. Thus, a signal from the positive component is provided at port 4.

Figure 3D:
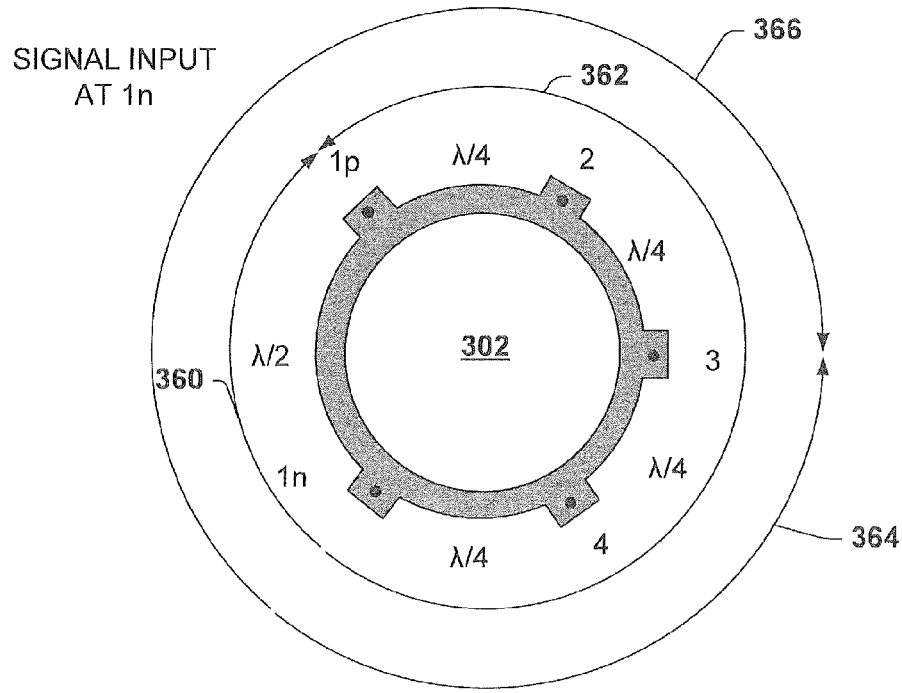
FIG. 3D is another diagram illustrating a single coupler signal converter system that performs transmit and receive signal separation and differential to single ended conversion in accordance with an embodiment of the invention.

FIG. 3D is another diagram illustrating the single converter system 300 in accordance with an embodiment of the invention. The system 300 includes the signal converter coupler 302. This diagram depicts a signal input at port 1n.

A second component of a differential signal, referred to as the negative component, is input to port 1n of the coupler. As a result, clockwise and counter clockwise portions of the signal travel in each direction around the coupler. As shown above, there are varied transmission lengths from port 1n to other ports of the coupler in both the clock wise and counter clockwise directions. These varied lengths result in phase shifts.

The transmission path length in the clockwise direction from port 1n to port 1p is also ½ a wavelength, which results is a 180 degree phase shift 360. The transmission length in the counter clockwise direction from port 1n to port 1p is 1 wavelength, which corresponds to 360 degree phase shift 362. As a result, the clockwise and counter clockwise portions cancel each other at port 1p. Thus, no power or signal from the negative component is provided at port 1p.

The transmission path length in the clockwise direction from port 1n to port 2 is ¾ a wavelength, which results is a 270 degree phase shift. The transmission length in the counter clockwise direction from port 1n to port 2 is also ¾ a wavelength, which corresponds to a 270 degree phase shift. As a result, the clockwise and counter clockwise portions constructively add with each other at port 2. Thus, a signal from the negative component is provided at port 2.

The transmission path length in the clockwise direction from port 1n to port 3 is 1 wavelength, which results in a 360 degree phase shift. The transmission length in the counter clockwise direction from port 1n to port 3 is ½ a wavelength, which corresponds to a 180 degree phase shift. As a result, the clockwise and counter clockwise portions cancel each other at port 3. Thus, no power or signal from the negative component is provided at port 3.

The transmission path length in the counter clockwise direction from port 1n to port 4 is ¼ a wavelength, which results is a 90 degree phase shift. The transmission length in the clockwise direction from port 1n to port 4 is 1 and ¼ wavelengths, which corresponds to 450 degree phase shift. As a result, the clockwise and counter clockwise portions constructively add with each other at port 4. Thus, a signal from the negative component is provided at port 4.

Reviewing FIGS. 3C and 3D, it can be seen that the differential signal input at ports 1p and 1n results in two single ended signals provided at port 2 and port 4.

Figure 3E:
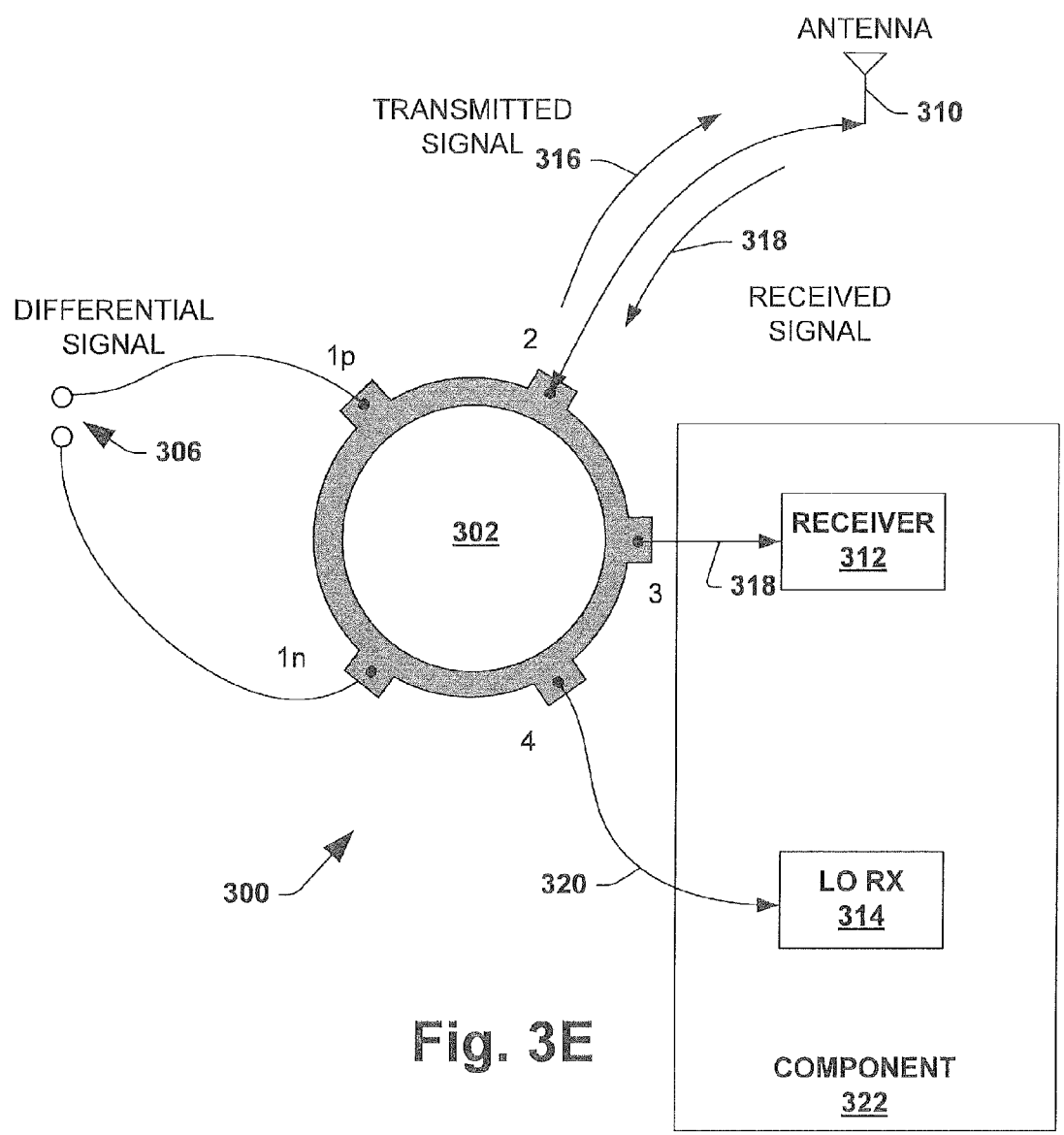
FIG. 3E is a diagram illustrating a single coupler signal converter system that performs transmit and receive signal separation and differential to single ended conversion in accordance with an embodiment of the invention.

FIG. 3E is a diagram illustrating the single converter system 300 in accordance with an embodiment of the invention. The system 300 includes the signal converter coupler 302, a differential signal 306, a receiver component 312, a local component 314, and an antenna 310. The system 300 can be utilized for a variety of uses including, but not limited to, radar systems, communication systems and the like.

The generated, differential signal 306 is coupled to differential ports, 1p and 1n as shown. The differential signal 306 is substantially sinusoidal and has a relatively high frequency for operation. In one example, the differential signal 306 operates at about 77 GHz. The differential signal can be particular to radar systems or for another application.

A single ended version of the differential signal 306, referred to as a transmitted signal 316, is provided at port 2. Port 2 is also referred to as an antenna port. The transmitted signal 316 is derived from the differential signal 306. The transmitted signal 316 may be amplified or filtered and is provided to the antenna 310 for transmission. A "copy" of the transmitted signal 316, referred to as a local signal 320, is provided at port 4 and is communicated to the local component 314. Port 4 is also referred to as a local port. The local signal 320 is derived from the differential signal 306 as shown above and can serve as a reference signal. Thus, the local signal 320 and the transmitted signal 316 are derived from the differential signal by the coupler 302 without substantial loss of power.

The antenna 310 also receives a signal, referred to as a received signal 318. The received signal 318 in radar systems is a delayed version of the transmitted signal 316, wherein the delay and/or other information can be utilized to identify objects or targets and determine distance and location there between. For a communication system, the received signal 318 contains information. The received signal 318 is provided as an input to port 2, the antenna port and is then provided at port 3. As shown above, port 3 is isolated from the differential signal and only the received signal 318 is provided. Continuing, the received signal 318 is provided to the receiver 312. The receiver 312 then performs additional processing on the signal 318. Port 3 is also referred to as a receiver port.

The received signal 318 is a single ended signal and is input at port 2. Half of the power from the signal 318 is provided to port 3. Another half is directed toward the differential pair 1p/1n, which is lost.

Component 322 can be present to analyze and communicate signals and information of the receiver component 312 and the local component 314. For a radar system, the component 322 analyzes or compares the received signal 318 and the local signal 320 to determine distance information. As shown above, the local signal 320 is a copy of the transmitted signal 316 and the received signal 318 is essentially the transmitted signal 316 with some delay. Thus, analysis can determine the delay and calculate distance or range information.

It is appreciated that alternate embodiments of the invention may omit component 322.

The transmission length between ports 1p and 2, ports 2 and 3, ports 3 and 4 and ports 4 and 1n is ¼ a wavelength. The transmission length between ports 1p and 1n is ½ a wavelength. It is noted that alternate embodiments of the invention can include other suitable transmission lengths between the ports and around the coupler 302. Other lengths that yield substantially similar phase shifts and are suitable, such as odd integer multiples of the above specified lengths. Thus, in another example, the transmission length between ports 1p and 2, ports 2 and 3, ports 3 and 4 and ports 4 and 1n is ¾ a wavelength. The transmission length between ports 1p and 1n is 3/2 wavelengths. It is appreciated that longer transmission lengths can lead to increased size, higher losses and lower bandwidth.

FIG. 4 is a table comparing single coupler and dual (two) coupler signal converters. The data shown in the table is illustrative in nature and is derived from simulated data. It is appreciated that variations can occur for other implementations.

The first row illustrates sample simulation data for a two coupler signal converter implementation, such as that shown in FIG. 2. The second row illustrates sample simulation data for a single coupler signal converter, such as that shown in FIG. 3E. It is appreciated that automotive radar bands operate at frequencies of around 77 GHz. The simulation for FIG. 4, was performed at about 79.5 GHz.

The first column depicts power loss from the differential signal provided to the system to the transmitted signal provided at a port that is then conveyed to an antenna. It can be seen that the two coupler system results in a power loss of 4.3 dB and the single coupler version results in 3.5 dB.

The second column depicts power loss of the differential signal converted to a single ended signal output at port 3. Here, the two coupler system results in a isolation of 35.0 dB and the single coupler system results in 50.0 dB.

The third column depicts power transfer from the antenna to the receiver. This involves a signal being received at an antenna and converted/routed via the coupler systems to a receiver. The two coupler system results in a power loss of about 3.3 dB. The single coupler system results in a power loss of about 3.5 dB.

It can be seen from the simulation data that the single coupler system of the present invention meets or exceeds the performance of two coupler converters while using less components and PCB space to do so.

FIGS. 5A-5F depict simulation data utilizing a single coupler signal converter, such as shown in FIG. 3E and a dual coupler signal converter, such as shown in FIG. 2.

Figure 5A:
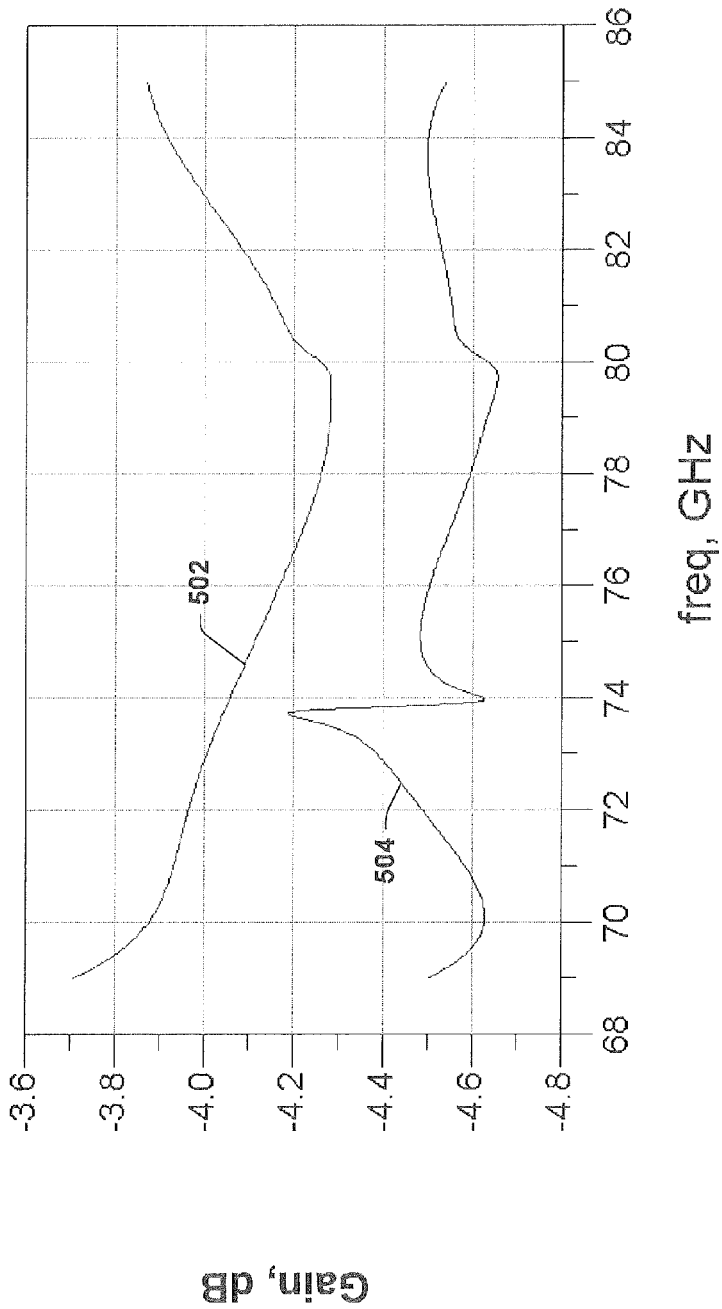
FIG. 5A is a graph illustrating conversion from a differential signal to an antenna port and a local port for a dual coupler signal converter.

FIG. 5A is a graph illustrating conversion from a differential signal 206 to an antenna coupler port and a local port with the dual coupler signal converter. An x-axis represents frequencies in GHz and a y-axis represents power gain expressed in dB. The differential signal 206 is converted by the two coupler system 200 and yields an output at port 2 and port 3. Line 502 represents the output at port 2, the antenna port, of the coupler 204. Line 502 represents a transmitted signal that can be transmitted, for example, by antenna 210. Line 504 represents the output at port 3 of the coupler 204, the local port. The signal at port 3 can be processed or utilized by the local component 214. These signals 502 and 504 should be substantially similar, however variations can be seen from the graph. Further, unwanted power loss can be seen.

Figure 5B:
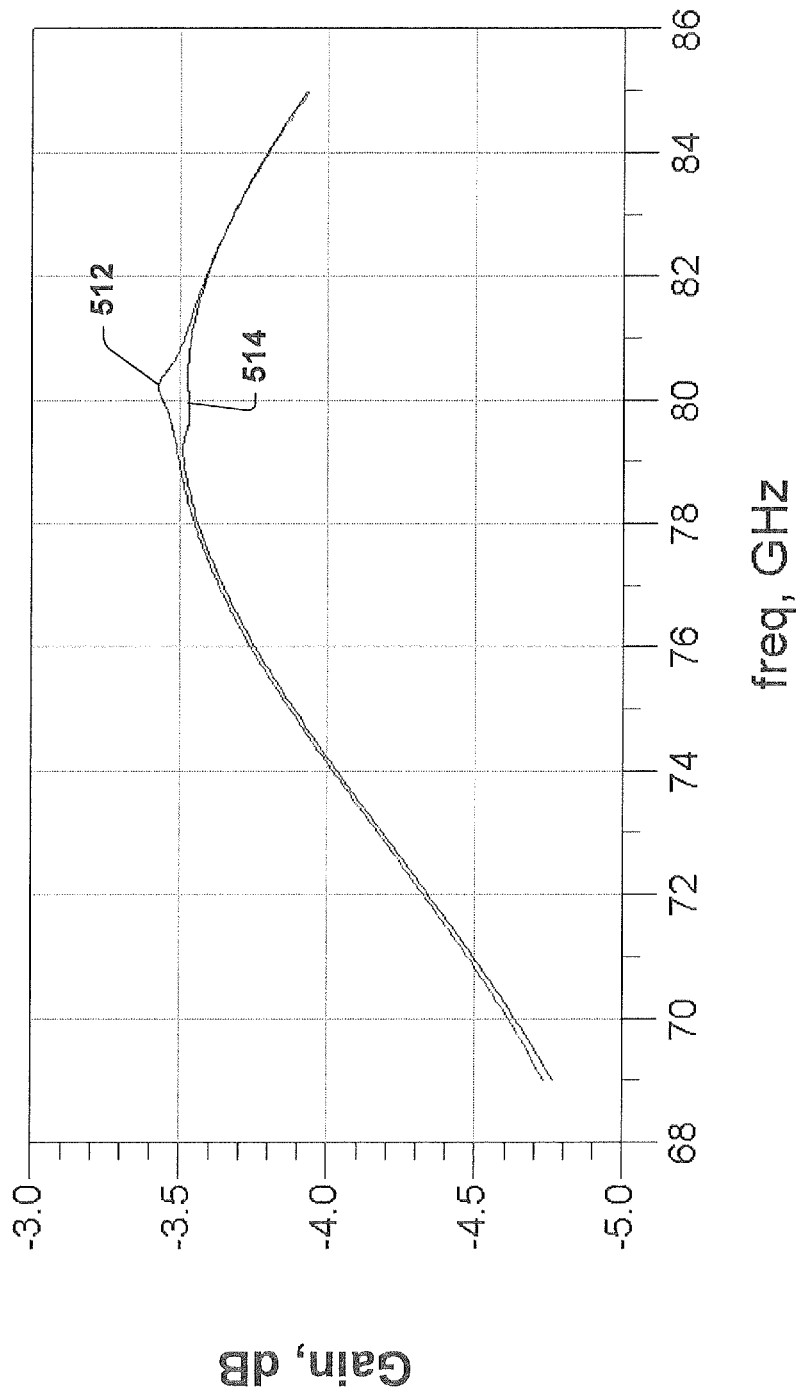
FIG. 5B is a graph illustrating conversion from a differential signal to an antenna port and a local port for a single coupler signal converter.

FIG. 5B is a graph illustrating conversion from a differential signal 306 to a transmitted signal 316 and a local signal 320 with a single coupler converter of the system 300 shown in FIG. 3E. An x-axis represents frequencies in GHz and a y-axis represents power gain expressed in dB. The differential signal 306 is converted by the coupler 302 to two single ended signals, the local signal 320 and the transmitted signal 316. The local signal 320 is provided at port 4 of the coupler 302 and the transmitted signal 316 is provided at port 2 of the coupler 302. Line 514 represents the local signal 320 and line 512 represents the transmitted signal 316. The signals 512 and 514 should be substantially similar and the graph of FIG. 5B shows that they are for the system 300. Further, it can be seen that the power loss is less when compared with the graph for the dual coupler system referenced in FIG. 5A.

Figure 5C:
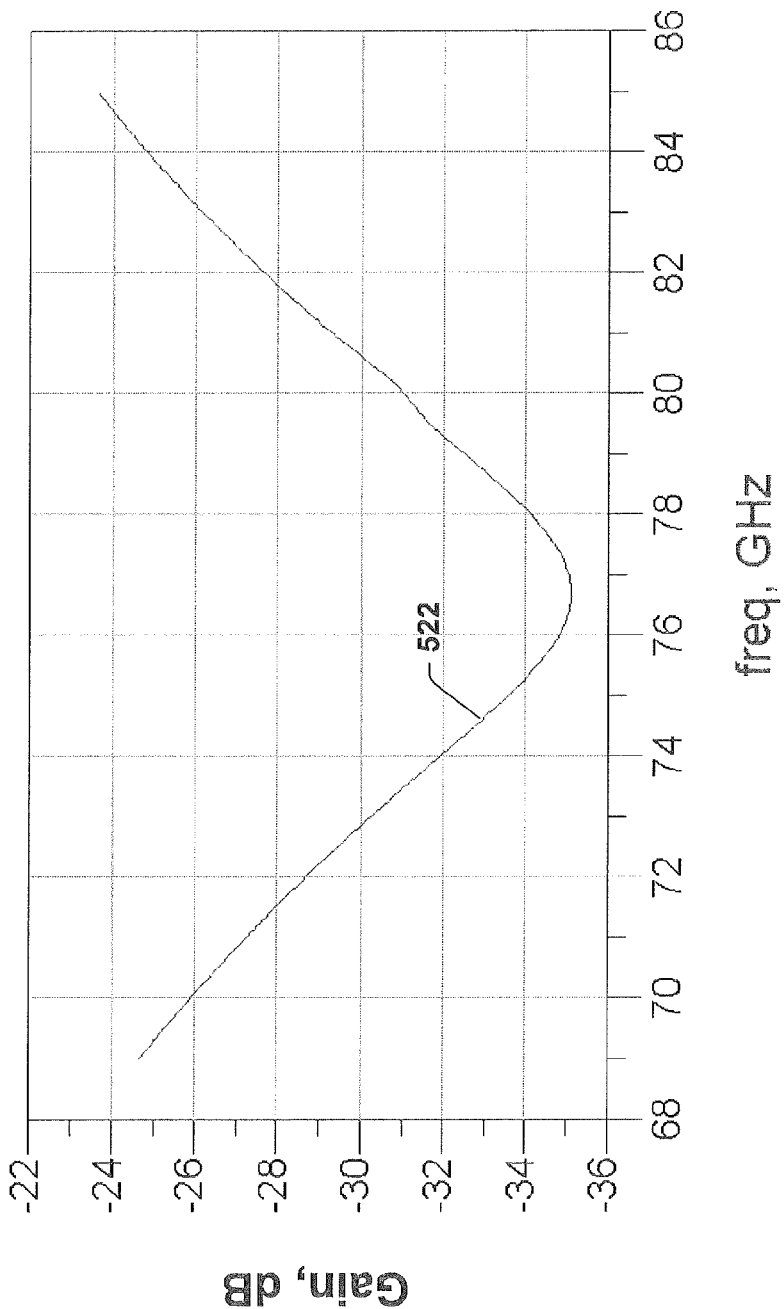
FIG. 5C is a graph illustrating isolation between a differential port and a receiver port for a dual coupler signal converter.

FIG. 5C is a graph illustrating isolation between the differential port and the receiver using a dual coupler signal converter, such as system 200 of FIG. 2. A differential signal 206 is provided at differential ports 1 and 4 of coupler 202. The differential signal 206 is converted to a single ended signal 208 and is provided at port 2 of the coupler 202. The single ended signal 208 is provided as an input to port 1 of second coupler 204. Port 4 of coupler 204 should be isolated from the signal input at port 1. The port 4 of the coupler 204 should only receive a received signal from antenna 210.

An x-axis represents frequencies in GHz and a y-axis represents power gain expressed in dB. Line 522 shows the power loss of the differential signal to the receiver via the port 4 of the coupler 204.

Figure 5D:
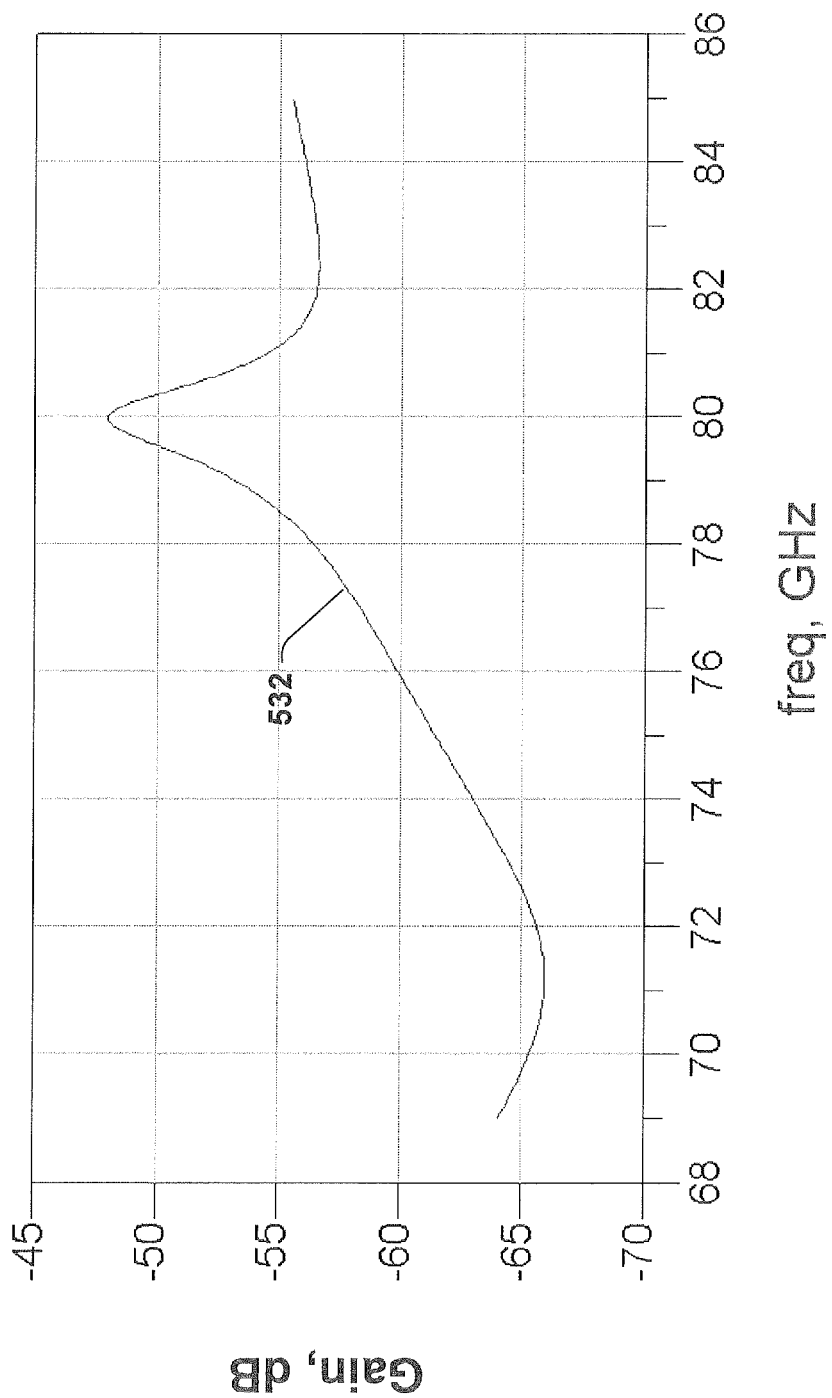
FIG. 5D is a graph illustrating isolation between a differential port and a receiver port for a single coupler signal converter.

FIG. 5D is a graph illustrating isolation between a differential signal and a receiver by utilizing a single coupler convert of the system 300 shown in FIG. 3E.

A differential signal 306 is converted to a transmitted signal 316 and a local signal 320, both single ended signals, with a single coupler converter of the system 300 shown in FIG. 3E. The differential signal 306 is provided at ports 1n and 1p of coupler 302. The transmitted signal 316 is provided at port 2 as an output and the local signal 320 is provide at port 4 as an output. Port 3 of the coupler 302 should ideally have no portion of the differential signal 306.

An x-axis represents frequencies in GHz and a y-axis represents power gain expressed in dB. Line 532 shows the isolation at the receiver 312 and the port 3 of the coupler 302 from the differential signal 306. A comparison with FIG. 5C shows improved isolation by the system 300.

Figure 5E:
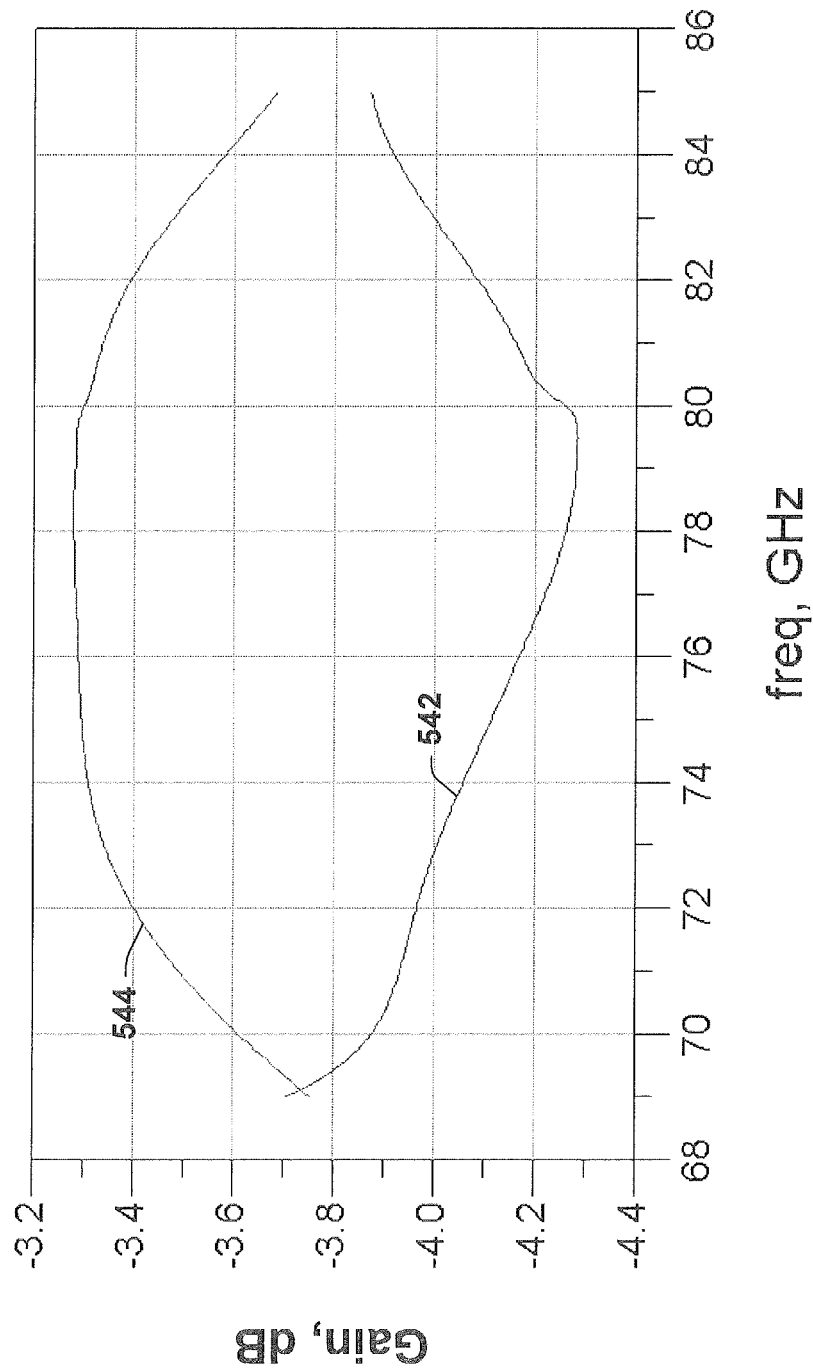
FIG. 5E is a graph illustrating power transfer from an antenna port to a receiver port and differential ports for a dual coupler signal converter.

FIG. 5E is a graph illustrating power transfer from the antenna port towards the receiver and the differential signal source ports using a dual coupler signal converter, such as system 200 of FIG. 2.

In operation, antenna 210 provides a received signal as an input to port 2. The received signal is passed to ports 4 and 1. At port 4, the portion of the received signal is provided as an output to the receiver 212. At port 1, the other portion of the received signal is provided as an output. However, the other portion provided at port 1 is not used and represents significant power loss.

An x-axis represents frequencies in GHz and a y-axis represents power gain expressed in dB. Line 542 represents power gain from port 2 to port 1. Line 544 represents power gain from port 2 to port 4.

Figure 5F:
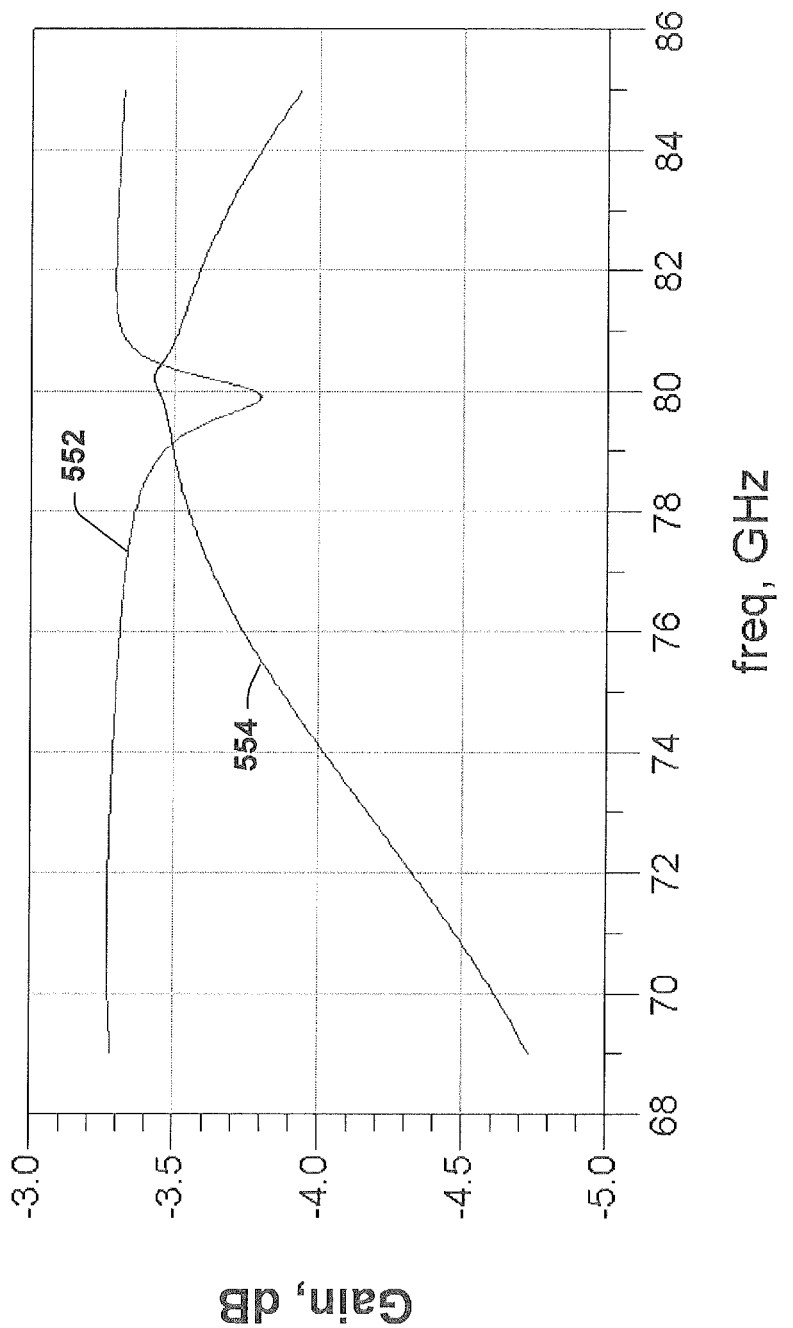
FIG. 5F is a graph illustrating power transfer from an antenna port to a receiver port and differential ports for a single coupler signal converter.

FIG. 5F is a graph illustrating power gain from an antenna port towards the receiver and the differential signal source ports utilizing a single coupler convert of the system 300 shown in FIG. 3E.

In operation and with reference to FIG. 3E, an antenna 310 provides a received signal 318 as an input to port 2 of coupler 302. The signal 318 is divided/copied and is provided at ports 3 and differential ports 1p and 1n. The portion provided at port 3 is used by receiver 312.

An x-axis represents frequencies in GHz and a y-axis represents power gain expressed in dB. Line 552 represents power gain of the signal provided at port 3. Line 554 represents the power gain of the signal provided at the differential ports 1p and 1n.

For both the single coupler signal converter system 300 of FIG. 3E and the dual coupler signal converter system 200 of FIG. 2, half of the power of the received signal is provided to a receiving component.

Figure 6:
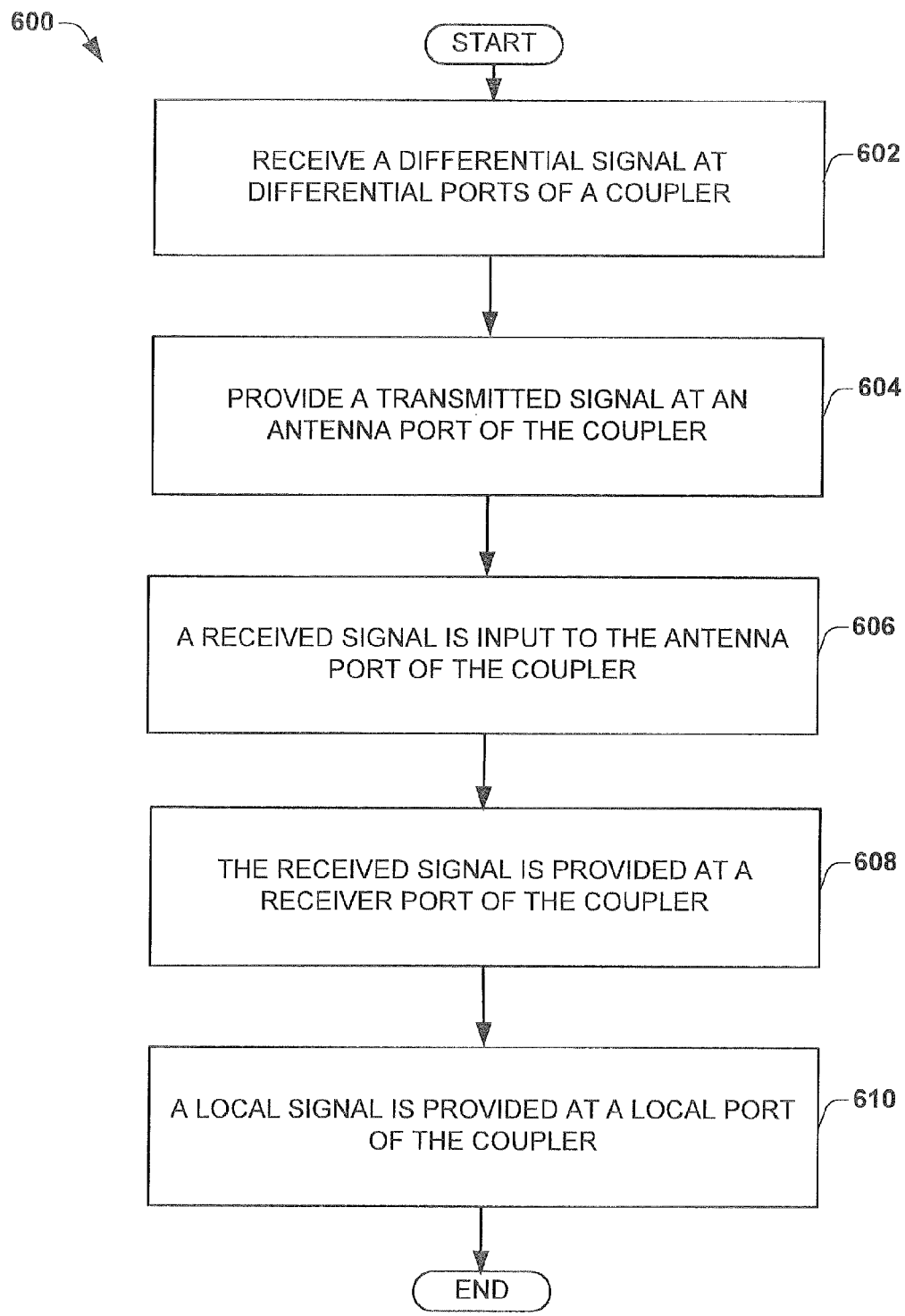
FIG. 6 is a flow diagram illustrating a method of performing signal conversions in accordance with an embodiment of the invention

FIG. 6 is a flow diagram illustrating a method 600 of performing signal conversions in accordance with an embodiment of the invention. The method performs signal conversion and separation with only a single coupler. The method 600 can be read in view of the system 300 described in FIGS. 3A-3E, however it is appreciated that other suitable hardware implementations are contemplated and in accordance with the present invention.

The coupler utilized differs from other 4 port couplers in that it has 5 ports. Examples of a suitable coupler are described with respect to FIGS. 3A-3E.

The method begins at block 602, where a differential signal is received at a differential port of a coupler. The differential port includes a positive port and a negative port. The differential signal is sinusoidal and, in one example has a relatively high frequency, e.g., 77 GHz.

A transmitted signal is provided at an antenna port of the coupler at block 604. The transmitted signal is derived or divided from the differential signal. The transmitted signal is a singled ended signal.

A received signal is input to an antenna port of the coupler at block 606. The received signal is typically obtained via an antenna or other device and is also a single ended signal. In one example, the received signal is a delayed version of the transmitted signal, such as for automotive radar applications. In another example, the received signal includes communicated information.

The received signal is provided at a receiver port of the coupler at block 608. The received signal is converted, derived, or divided from the received signal input to the antenna port. The received signal is typically provided at the receiver port with less power than that at the antenna port due to operation of the coupler. The received signal can be provided to a receiver component in alternate embodiments.

A local signal is provided at a local port of the coupler at block 610. The local signal can be referred to as a copy of the transmitted signal. The local signal is derived or divided from the differential signal. The local signal is a single ended signal. The local signal can be provided to a local component in alternate embodiments.

For automotive radar applications and the like, the received signal can be compared with the local signal to determine radar information, including delay and distance.

While the methods illustrated herein are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of systems which are illustrated and described herein as well as in association with other systems not illustrated, wherein all such implementations are contemplated as falling within the scope of the present invention and the appended claims.

Although the invention has been illustrated and described with respect to one or more implementations, alterations and/or modifications may be made to the illustrated examples without departing from the spirit and scope of the appended claims.

In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (or another functionally equivalent embodiment), even though not structurally equivalent to the disclosed structure which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising". In addition, to the extent that the terms "number", "plurality", "series", or variants thereof are used in the detailed description or claims, such terms are to include any number including, but not limited to: positive integers, negative integers, zero, and other values.

What is claimed is:

1. A single coupler system, comprising:
   differential ports of the single coupler configured to receive a differential signal from a differential signal source;
   an antenna port of the single coupler configured to output a transmitted signal and to input a received signal;
   a receiver port of the single coupler configured to output a portion of the received signal;
   a local port of the single coupler configured to output a local signal; and
   a transmission path coupled to the differential ports, the antenna port, the receiver port, and the local port.

2. The coupler of claim 1, wherein the differential portions comprise a positive port and a negative port.

3. The coupler of claim 1, wherein the transmitted signal and the local signal are single ended versions of the differential signal.

4. The coupler of claim 1, wherein the differential signal is a radar signal.

5. The coupler of claim 1, wherein the differential signal is a communications signal.

6. The coupler of claim 1, wherein the local signal is a first portion of the differential signal and the transmitted signal is a second portion of the differential signal.

7. The coupler of claim 1, further comprising an antenna to transmit the transmitted signal and to receive the received signal.

8. The coupler of claim 1, further comprising a receiver to receive the received signal from the receiver port.

9. The coupler of claim 1, wherein the transmission path is circular shaped and has a length of an odd integer multiple of one and a half wavelength.

10. The coupler of claim 9, wherein a transmission path length from a positive port of the differential ports to the antenna port is an odd integer multiple of ¼ a wavelength.

11. The coupler of claim 10, wherein a transmission path length from the antenna port to the receiver port is an odd integer multiple of ¼ a wavelength.

12. The coupler of claim 1, wherein the differential signal has a frequency of about 77 GHz.

13. A signal conversion system comprising:
   a receiver configured to process a received signal;
   a local component configured to process a local signal;
   a source to generate a differential signal; and
   a single coupler system, comprising:
      a circular transmission path;
      differential ports of the single coupler on the transmission path configured to receive the differential signal, the differential ports comprising a first port and a second port;
      an antenna port of the single coupler configured to provide a transmitted signal and input a received signal, the transmitted signal is a single ended signal converted from the differential signal;
      a receiver port of the single coupler isolated from the differential signal and configured to provide the received signal from the antenna port; and
      a local port of the single coupler configured to provide a local signal converted from the differential signal.

14. The system of claim 13, wherein the receiver is coupled to the local component and compares the received signal with the local signal to determine delay.

15. The system of claim 14, wherein the delay is utilized to determine distance for a radar application.

16. The system of claim 13, wherein the received signal is a communication signal.

17. A method of converting signals comprising:
   receiving a differential signal at differential ports of a single coupler system;
   providing a transmitted signal at an antenna port of the single coupler;
   inputting a received signal at the antenna port of the single coupler;
   providing the received signal at a receiver port of the single coupler; and
   providing a local signal at a local port of the single coupler.

18. The method of claim 17, further comprising comparing the received signal with the local signal to determine delay in the received signal.

19. The method of claim 17, wherein providing the transmitted signal comprises converting a portion of the differential signal to a single ended signal having about half the power of the differential signal.

20. The method of claim 17, further comprising a receiver that obtains the received signal from the receiver port.

* * * * *